Aug. 23, 1955  J. M. LESTER ET AL  2,716,234
RADAR BOMBING INDICATOR APPARATUS
Filed June 2, 1948  3 Sheets-Sheet 1
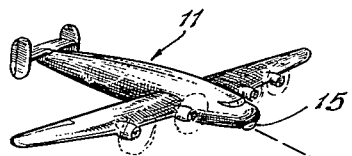
Fig.1.
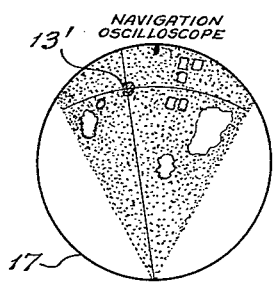
Fig.2.
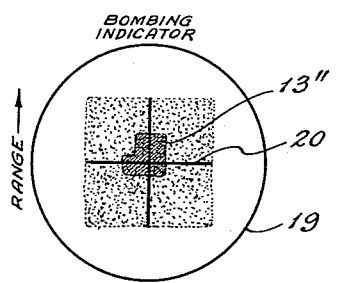
Fig.3.
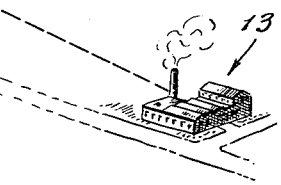
Fig.4.
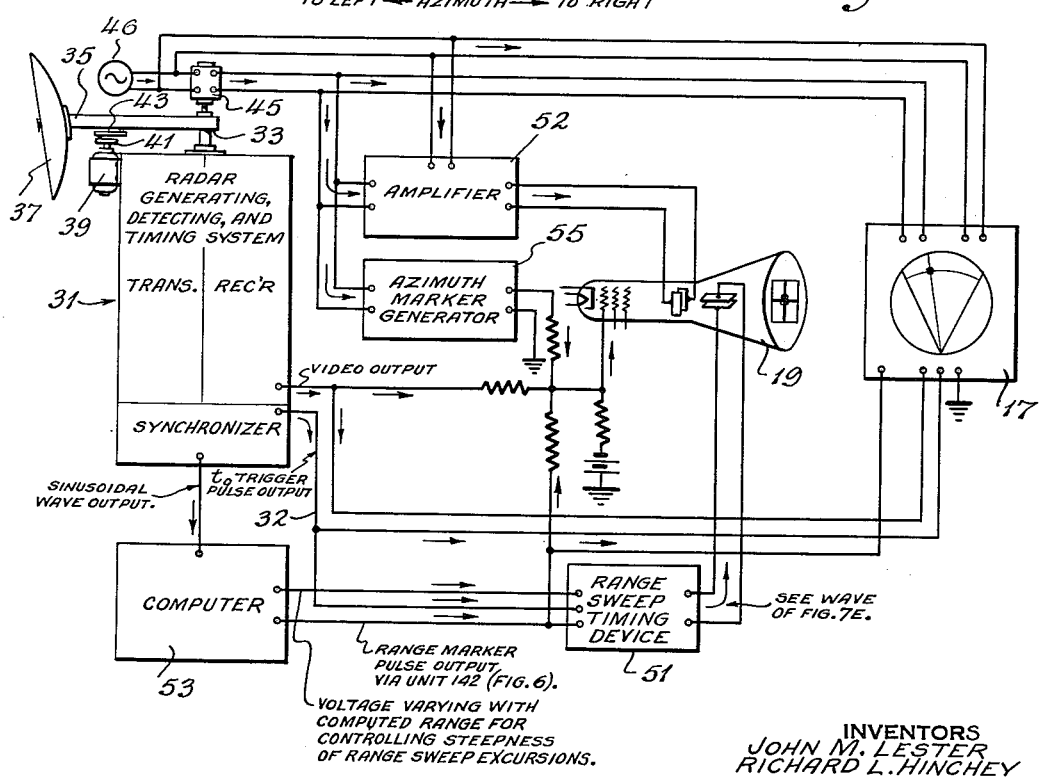
INVENTORS
JOHN M. LESTER
RICHARD L. HINCHEY
BY
Thomas M. Ferrill, Jr.
ATTORNEY Aug. 23, 1955  J. M. LESTER ET AL  2,716,234
RADAR BOMBING INDICATOR APPARATUS
Filed June 2, 1948  3 Sheets-Sheet 2
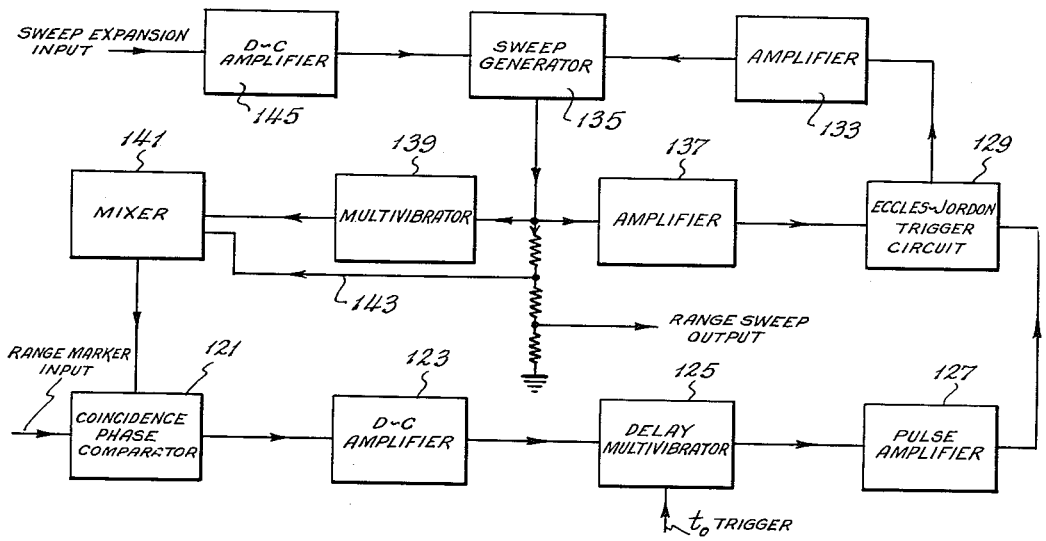
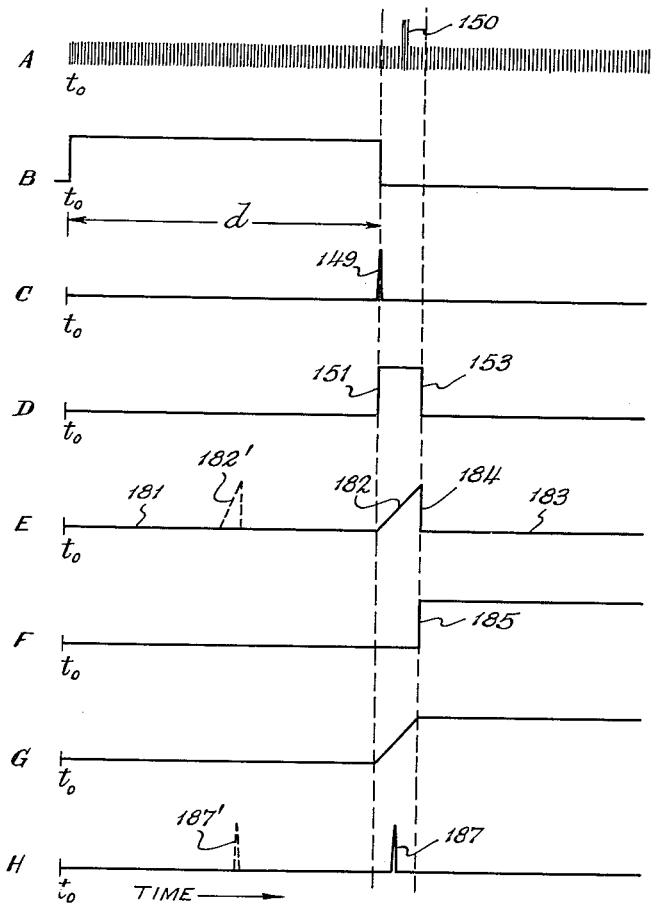
INVENTORS
JOHN M. LESTER
RICHARD L. HINCHEY
BY
Thomas M. Ferrill, Jr.
ATTORNEY INVENTORS
JOHN M. LESTER
RICHARD L. HINCHEY
BY
Thomas M. Ferrill, Jr.
ATTORNEY United States Patent Office 2,716,234
Patented Aug. 23, 1955

2,716,234

RADAR BOMBING INDICATOR APPARATUS

John M. Lester, Hempstead, and Richard L. Hinchey, Great Neck, N. Y., assignors to Sperry Rand Corporation, a corporation of Delaware Application June 2, 1948, Serial No. 30,611

18 Claims. (Cl. 343—11)

The present invention relates to radar systems, and is particularly concerned with the provision of an improved high-precision vernier target range indicating system especially useful in aerial bombardment.

Radar data has heretofore been relied upon in a bombing aircraft in computing the required path of the aircraft and the position at which the bombs are to be released. For this purpose, a complete radar system is employed to determine the slant range to the target and the direction thereto relative to the aircraft, and these data are supplied to a bombing computer mechanism together with data as to the aircraft's altitude, speed and direction. The computer mechanism includes motive means and trigonometric function devices driven thereby for continuously indicating computed variations of relative target position, as well as for indicating when the bombs should be released.

In patent application No. 443,573, filed May 19, 1942, in the name of Joe J. Caldwell, a radar system arranged particularly for supplying bombardment data is described. This arrangement includes not only the general purpose oscilloscope for providing a plot of range versus azimuth angle of all targets generally ahead of the craft within a large radius (e. g. within fifty miles), but also a "vernier" oscilloscope arranged to receive target image signals from the radar receiver, and to receive "range marker" pulses delayed in phase relative to the transmitted radar pulses by an amount regulated by the computer according to the time delay for reflected pulses from the computed target range. This "vernier" oscilloscope or "bombing indicator" presents a magnified radar view of the target and immediate vicinity, and provides for a comparison of actual target range with the computed range data. Such an arrangement has proven advantageous for reference by the bombardier, as it enables him to observe minor discrepancies between computed target positional data and the radar measured data, and to make appropriate minor adjustments to the computer.

A disadvantage of this bombing indicator was the fixity of the field of slant range represented by the fixed vertical sweep scale dimensions on the oscilloscope. Since the slant range scale of the vertical dimensions remained fixed while the fixed angular spread represented by the width of the pattern corresponded to a decreasing linear dimension in the target area as the aircraft approached the objective, the target representation on the oscilloscope of the aforementioned patent application became greatly distorted during the "bombing run."

An important object of the present invention is to provide an improved bombing indicator arrangement for use with a radar system and bombing computer. More particularly, it is an object to provide a bombing indicator arranged to give a substantially undistorted radar representation of the target and features in the immediate vicinity thereof, throughout the bombing run.

In meeting these objectives, the present invention provides variation of the time duration of the sloping voltage wave portions or voltage excursions employed for effecting the vertical sweeps of the vernier oscilloscope or bombing indicator, the durations of these voltage excursions being made to decrease substantially proportionately with the decreasing horizontal component of distance to the target as the craft approaches.

With the changing durations of these vertical sweep voltage excursions as the craft approaches the target, the problem of keeping the vertical sweeps of the oscilloscope properly timed in relation to the computed range marker pulses supplied by the bombing computer becomes complex. It is highly desirable to have the computed range marker pulses produce a range mark fixedly positioned across the middle of the oscilloscope screen, and this means that the initiations of the successive vertical sweep voltage excursions cannot be held to a constant time margin or lead interval ahead of the computed range marker pulses. The sweep voltage excursions must be initiated before the respective range marker pulses, but by a decreasing time margin as the craft carries out the bombing run.

Accordingly, it is a further important object of the present invention to provide an arrangement for timing the vertical sweep voltage excursions of the bombing indicator or vernier oscilloscope in such a way that the range marker pulses always occur simultaneously with the mid-points of the range sweep voltage excursions.

This feature is accomplished through the provision of a phase comparator arranged to receive the range marker pulses (these pulses being phased according to the computed range) and to receive the sweep voltage excursions from the range sweep voltage generator of the bombing indicator, and to provide an output voltage varying in sense and magnitude according to variations of timing of the mid-point of the vertical sweep voltage excursions from the desired coincidence with the range marker pulses. An amplified version of this phase comparator output voltage is used to control the delay of initiation of range sweeps in the bombing indicator relative to the timing of the transmitted radar pulses, to shift the range sweep timing as required to bring the range sweep mid-points to substantial coincidence with the range marker pulses.

The above objects and general description of the present invention and further objects and features thereof will be made more clearly apparent in the following detailed description of the invention, given in reference to the accompanying drawings, wherein:

Fig. 1 is a general representation of a bombing craft approaching the target;

Figs. 2 and 3 are illustrations of the navigational or general-view radar oscilloscope and the bombing indicator (vernier oscilloscope), respectively;

Fig. 4 is a schematic representation of the bombardment radar system, diagrammatically showing the inter-relations of the radar apparatus, the oscilloscope indicators and the bombardment computing apparatus;

Fig. 5 is a schematic block diagram of the range sweep timing apparatus illustrated in Fig. 4;

Fig. 7 is a group of wave form plots referred to in explaining the operation of the apparatus shown in Figs. 5 and 6.

Figure 6:
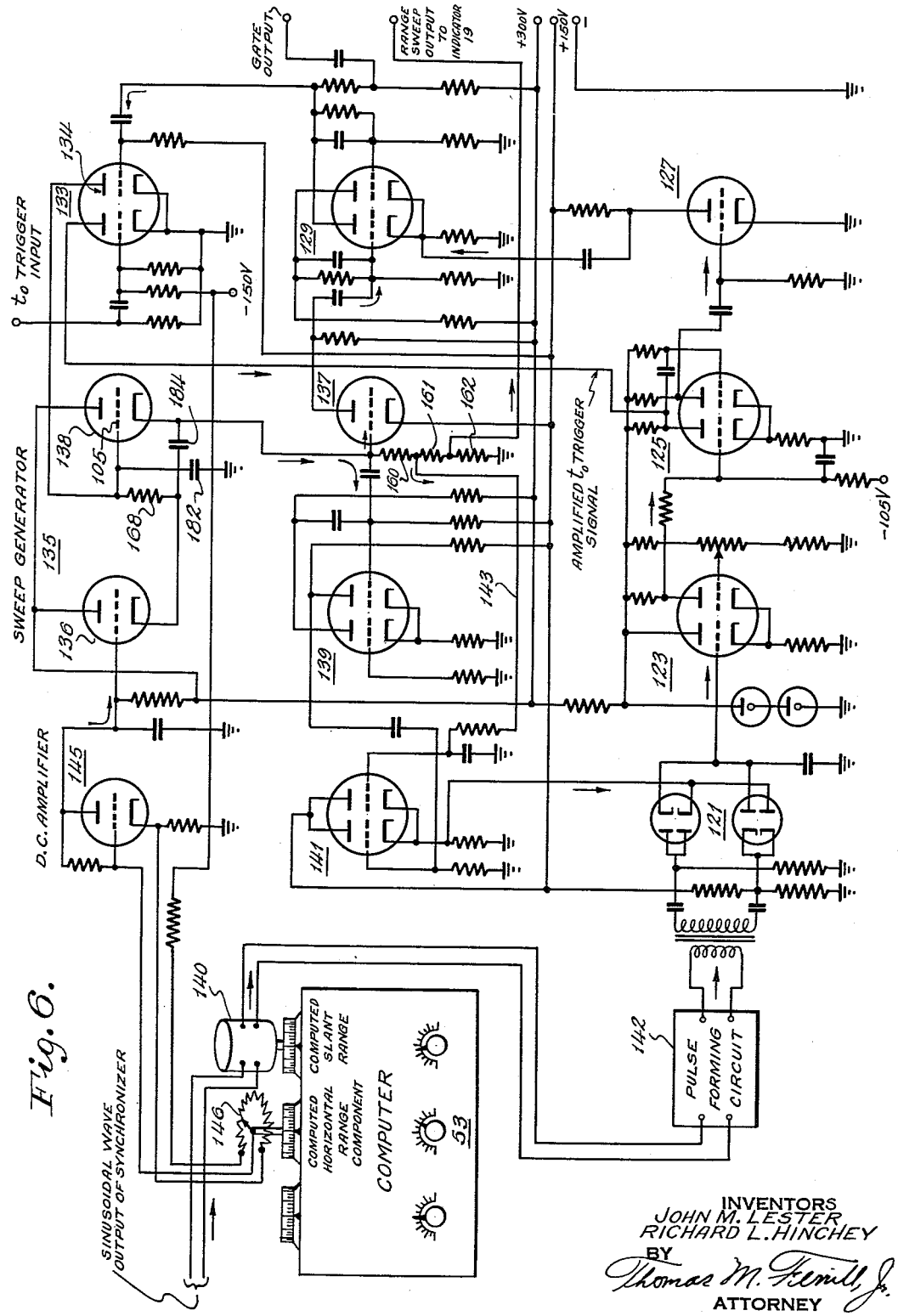
Fig. 6 is a circuit diagram of the range sweep timing apparatus.

Referring now particularly to Fig. 1, there is shown an aircraft 11 approaching a position above an intended target 13. Aircraft 11 is equipped for carrying out bombing missions, and is provided with a radar system which may be housed in the spherical "Plexiglas" housing 15 for operation under control of the bombardier. The bombardier is provided with two indicators 17 (Fig. 2) and 19 (Fig. 3), the first being a general position indicating oscilloscope referred to as a "navigation indicator,"

showing not only an image of the intended target, as at 13', but also images representing other energy reflecting objects such as buildings or other projections or irregularities in the terrain. This indicator is illustrated as providing an "off-set P. P. I." type indication.

The bombing indicator 19 is arranged to provide a greatly magnified view of the target, the field of azimuth directions and ranges represented on this oscilloscope being relatively small parts of the total field of azimuth angles and ranges indicated on oscilloscope 17 of Fig. 2. Thus, whereas the oscilloscope 17 of Fig. 2 shows all energy reflecting objects within a large radius (e. g. a radius of fifty miles) and an appreciable azimuth angular spread (e. g. a sector of 30°), the indicator of Fig. 3 may be so arranged that only those objects within a sector of the order of ±2° from the selected azimuth direction, and of range within ±1/10 mile of a three mile distance, for example, are indicated thereon. Thus, a greatly magnified radar view of the target 13" and immediate vicinity is provided on the bombing indicator or vernier oscilloscope 19 of Fig. 3.

Referring now to Fig. 4, the radar energy generating and detecting and pulse timing system is indicated generally at 31. The transmitter and receiver sections thereof are coupled as through a rotation-permitting joint 33 to a wave guide system 35 and thence to a directive antenna 37. Means are provided for causing oscillation of the antenna 37 about the axis of joint 33, a motor 39 being schematically shown with an eccentric 41 and connecting rod 43 for this purpose.

A pick-off arrangement is provided for producing an output signal modulated according to variations of the antenna direction, a potentiometer or other control means being suitable for this purpose. The pick-off illustrated is a selsyn 45 energized by an alternating voltage source 46, and arranged to produce output voltage varying in phase and amplitude according to the angular position of the antenna. The navigation oscilloscope 17 is illustrated as coupled to the alternating voltage source 46 and to the azimuth angle pickoff selsyn 45, and to the receiver and synchronizer sections of the radar system.

The bombing indicator oscilloscope 19 has its vertical deflection plates connected to the output circuit of the range sweep timing apparatus 51 embodying the present invention. The horizontal deflection plates of oscilloscope 19 are coupled to the output circuit of phase sensitive amplifier 52, which is coupled to the alternating voltage source and to the output circuit of phase shifter 45. Sweep timing apparatus 51, computer 53 and the synchronizer section of radar unit 31 are interconnected as illustrated generally in Fig. 4. The cathode ray beam intensity control system of oscilloscope 19 is coupled to the output of computer 53 for the range marks, to the output of the receiver section of the radar unit 31 for providing the target representation, and to the output circuit of an amplifier system 55 for providing an azimuth reference mark corresponding to the passage of the antenna 37 through its neutral direction, as detected by noting passage of the output of selsyn 45 through a momentary null condition.

The principal features of the present invention are involved in arranging apparatus 51 in such a way that the slopes of the range sweep voltage excursions are increased as the target range decreases, and that the range mark 20 on oscilloscope 19, representing computed target range, always remains stably positioned midway between the upper and lower limits of the screen, so that discrepancies between computed range data and actual radar measured distance to the target appear as gradual movements of the target image over the screen. The circuit arrangements through which this is provided are illustrated more fully in Figs. 5 and 6, to which reference will now be made.

In Figs. 5 and 6 there is shown a sweep control circuit arrangement including a phase comparator 121, an amplifier 123, a delay multivibrator 125, and a pulse forming circuit and amplifier 127 arranged to supply to an Eccles-Jordan trigger circuit 129 pulses delayed by a voltage-controllable delay time after transmitter trigger pulses supplied by the synchronizer section of radar apparatus 31. A feedback loop circuit is provided including an amplifier 133, a sweep voltage generator 135, for providing a regularly rising voltage of controllable slope (i. e. controllable rate of voltage rise), and an amplifier 137 arranged to trigger off the Eccles-Jordan circuit 129 upon attainment of a predetermined limiting potential of the range sweep wave. This feedback loop circuit operates to hold the range sweep wave amplitude constant.

The output voltage of the range sweep generator 135 is applied to a multivibrator 139 arranged to generate a positive rectangular voltage pulse immediately following the range sweep voltage excursion of sweep generator 135. This rectangular voltage pulse is employed in a mixer 141 to supplement the brief linear-rise voltage excursion produced by range sweep generator 135, to provide a composite wave form characterized by two different voltage levels each maintained through an appreciable time, with the desired sloping sweep wave intermediate therebetween.

This composite output wave produced in mixer 141 is supplied to the sawtooth voltage input circuit of the coincidence phase comparator 121. The pulse input circuit of this comparator 121 is supplied with range marker pulses by a pulse forming and amplifying circuit 142 supplied with alternating voltage through a phase shifter 140 coupled to the slant range shaft of computer 53. The output voltage of phase comparator 121 is a reversible- polarity voltage of polarity and magnitude representing the sense and extent of departure of the range marker pulses from time coincidence with the mid-points of the range sweep voltage excursions produced by sweep generator 135. Such a phase comparator arrangement is illustrated in Fig. 10 of a paper published by Wendt and Fredendall in Proceedings of the I. R. E., January 1943, volume 31, page 7, the description of Fig. 10 being on pages 11 and 12.

The variations of the direct output voltages of phase comparator 121 are amplified in D. C. amplifier 123, and the output of this amplifier is employed to control the duration of the rectangular waves produced by multivibrator 125. The rectangular waves produced by this stage 125 are initiated simultaneously with the radar pulse transmissions by the signal supplied from the synchronizer section of radar apparatus 31, and since the durations of these regular pulses vary greatly with slight changes of output voltage of unit 123, the timing of the ends of the rectangular waves produced by unit 125 is accordingly varied greatly for very slight changes of the output potential produced by unit 121.

The coupling circuit between units 125 and 127 is an R–C circuit having a very short time constant, so arranged that a sharp voltage pulse is formed and applied to the grid of amplifier 127 precisely at the end of the rectangular output wave of unit 125. This pulse is amplified in unit 127 and employed to shift the Eccles-Jordan circuit 129 over to one of its two stable operating conditions. The Eccles-Jordan circuit is transferable back to the other stable operating condition by an output voltage coming through amplifier 137.

From the moment it is triggered on by the output of amplifier 127 until it is triggered off by amplifier 137, the Eccles-Jordan circuit 129 supplies a rectangular output voltage wave to amplifier 133 which controls the sweep generator 135, making the latter generate an inclined voltage wave portion or excursion, the slope of this wave portion being determined by the direct voltage applied through an amplifier 145 to the grid of triode portion 136 of the sweep generator 135. This voltage and the resultant excursion slope are controlled by a potentiometer 146 on the horizontal range shaft of computer 53, the excursion being made steeper as the target is approached.

Upon attainment of the predetermined limiting output voltage of the sweep generator, the output of amplifier 137 triggers the Eccles-Jordan circuit 129 back to its first stable condition, to have it remain in this condition until a further pulse is supplied from pulse amplifier 127, this further pulse to arrive following a further transmitted radar pulse.

The sensitivity of phase comparator 121 being very high, and the gain of amplifier 123 and delay sensitivity of multivibrator 125 to slight voltage change being quite high, a very slight change of the timing of the midpoint of the range sweep voltage excursion from coincidence with the range marker pulses is sufficient to change the voltage fed through amplifier 123 enough to provide any required duration of the output waves from delay multivibrator 125, and hence to provide any required timing of the pulses supplied from stage 127 to stage 129. This arrangement operates in the manner of a "tight" servo system, retaining the range mark on tube 19 substantially at the middle height of the screen.

The wave forms encountered in the operation of the apparatus of Figs. 5 and 6 are illustrated at A to H in Fig. 7, all of these graphs being drawn to a common time scale. At A there is shown a representation of the "video" output voltage variations of the receiver section of the radar apparatus 31, during the interval between two successive transmitted pulses. At the left-hand extreme, denoted as at the initial time $t_0$, the radar pulse is transmitted, this pulse being initiated under the timing control of the synchronizer section of apparatus 31, and being of the order of time duration of one microsecond, whereas the repetition rate may be of the order of 2000 pulses per second. Thus, the common time scale of Figs. 7A–G may be of the order of 500 microseconds extent. This graph in Fig. 7A represents the output of the receiver section of apparatus 31 as observed on an oscilloscope having regular sawtooth horizontal sweep voltage synchronized with the transmitted pulses (i. e. set for 2000 cycles per second according to the above illustrated figures), and having the radar receiver video output supplied to its vertical deflection plates through a suitable wide band amplifier.

The noise output of the radar receiver appears as irregular light and short vertical lines running through the horizontal extent of the pattern, and a target reflection signal is represented as a prominent pulse 150 extending upward well above the noise pattern, brighter than the noise-representing portion of the picture, and displaced from position $t_0$ by a distance corresponding to the time delay and hence to the target distance.

Fig. 7B represents the output voltage wave from delay multivibrator 125, the delay time (dimension $d$) being determined by the voltage applied to the input circuit of multivibrator 125 through unit 123. Fig. 7C represents the pulse 149 formed by the differentiating coupling circuit between units 125 and 127, inverted and amplified by amplifier 127.

Fig. 7D represents the output voltage from the Eccles-Jordan circuit 129, the vertical-rise portion 151 of this output wave being coincidental with the triggering "on" (i. e., to the second stable condition) of the Eccles-Jordan circuit 129 by the pulse wave (Fig. 7C) from pulse amplifier 127, and the substantially vertical voltage drop portion 153 of this graph corresponding to the "switch-off" (the switch back to the first stable condition) of the Eccles-Jordan circuit, accomplished by amplifier 137 at the attainment of the limit voltage in the range sweep voltage excursion.

Fig. 7E represents the output voltage wave form produced by sweep generator 135, showing the voltage applied to the vertical deflection plates of the cathode ray oscilloscope 19. This shows the substantially linear excursion 182 which produces the substantially linear range sweep from the bottom to the top of the bombing indicator. This graph represents variations of the potential of the cathode of tube 138 of the range sweep generator 135 with respect to the ground, and similarly represents the time variations of current through resistors 160, 161 and 162 to ground.

When the Eccles-Jordan trigger circuit 129 is in the first stable condition—the condition which follows a pulse through amplifier 137 and prevails until the occurrence of a new sweep initiation timing pulse through amplifier 127—the grid of triode section 134 of tube 133 is positively biased with respect to its cathode, and the anode-to-cathode resistance presented by this tube is very low. During this time, current flows from the anode of tube 136 (at 300 volts positive potential above ground) to the cathode, thence through resistor 168 to the anode of triode section 134, and through the cathode of triode section 134 to ground. The resistance of the space conduction path in triode 134 during this time being very low, the voltage drop therein is quite low, so that the grid of tube 138 is at a very low positive potential above ground, and the current through resistors 160, 161 and 162 to ground is a very low current, producing relatively low voltage drop across these resistors, but enough to make the cathode potential of tube 138 higher than the potential common to its grid and the anode of triode 134. Hence, the grid of tube 138 is at a negative potential difference from its cathode.

The low potential produced across resistors 160, 161 and 162 is represented by portion 181 of Fig. 7E. These conditions remain substantially unchanged, with capacitor 182 charged to the potential of the grid of tube 138, until the Eccles-Jordan trigger circuit 129 is triggered to its other stable operating condition by the pulse 149 (Fig. 7C) supplied through amplifier 127. Upon the occurrence of this pulse and the change in the Eccles-Jordan circuit output potential as represented in Fig. 7D, the control grid of tube 134 is abruptly changed to a high negative potential, cutting off current flow through this triode. With this current cut off, conditions in the circuits associated with tube 138 immediately commence changing toward a new (and relatively remote) set of equilibrium conditions, the control grid potential of tube 138 rising toward a relatively high positive potential above ground, and the current through resistors 160, 161 and 162 rising accordingly. The rate of rise of the potential of grid 105 is limited to the rate at which the potential across capacitor 182 can rise as a result of current flowing thereinto through resistor 168, and this rate is in turn determined by the potential of the cathode of tube 136 resulting from the potential maintained at its control grid by the amplifier 145, and therefore by the setting of potentiometer 146.

During the short time interval during which triode 134 remains biased to cut-off, and practically acts as a switch in shunt with capacitor 182 which is opened for a brief interval, the potential across capacitor 182 rises substantially linearly, the grid potential of tube 138 increasing accordingly, and the current through the voltage across resistors 160, 161 and 162 similarly increasing accordingly. Since the rate of charging of capacitor 182 is dependent not only on the resistance-capacitance product of elements 168 and 182 but also on the voltage across resistor 168, and since this is dependent upon the cathode potential of tube 136, it is apparent that the steepness of the range sweep excursions is subject to being increased greatly by raising the potential of the cathode of tube 136 through the application of higher positive potential to its grid. Capacitor 184 between the cathode of tube 136 and the cathode of tube 138 is a relatively large capacitor, so that its time constant with resistance of the order of resistor 168 is quite long compared to the longest durations of the range sweep excursions. Representative values of resistor 168 and capacitors 182 and 184 are 150,000 ohms, 75 micro-microfarads, and 0.01 microfarad, respectively, for a pulse repetition rate of 800 pulses per second.

When the voltage across resistors 160, 161 and 162 in the cathode circuit of tube 138 has increased to a predetermined value, the output potential of tube 137 reaches a value at which it triggers the Eccles-Jordan trigger circuit 129 back to the first stable operating condition, ending the cut-off biased condition of triode 134, and causing this tube to bring the control grid of tube 138 abruptly back to the low potential represented at 183 corresponding to the potential of line portion 181, and capacitor 182 is discharged through triode 134 for restoration of the equilibrium conditions which preceded pulse 149.

The substantially linear inclined portion 182 represented in Fig. 7E corresponds to the voltage rise or excursion produced according to the foregoing description of operation of the sweep generator 135.

Multivibrator 139 is synchronized with the termination portion 184 of Fig. 7E for producing a rectangular output voltage wave as represented at Fig. 7F with its leading edge 185 timed in coincidence with the abrupt fall 184 of output potential of the range sweep voltage generator 135. The composite wave produced by mixer 141 from the waves corresponding to Figs. 7E and 7F is represented at Fig. 7G. The multivibrator 139 and the mixer 141 are interposed between the range sweep voltage generator 135 and the phase comparator 121 for insuring that the output of comparator 121 will always unambiguously represent the phase or timing relation between the range sweep excursions and the range marker pulses, however far these may be from the desired time coincidence. Without units 139 and 141, the wave supplied from sweep generator 135 to comparator 121 if for some reason greatly advanced in phase from its proper timing, could cause the output of comparator 121 to be of the sense tending to advance the phase of the range sweep voltage excursions, and hence to prevent the system reaching the desired synchronization.

The range marker pulse wave produced through the action of phase shifter 140 and pulse forming circuit 142 is represented at Fig. 7H, the range marker pulse being shown at 187. It is to be noted that the range sweep wave represented in Fig. 7E has its mid-point substantially in time-coincidence with pulse 187.

As the aircraft moves on toward a position above the target, the computer turns the shafts coupled to units 140 and 146 toward progressively lower range readings. As a result of the progressive actuation of phase shifter 140, pulse 187 proceeds slowly to the left as seen in Fig. 7H. This tends to cause phase comparator 121 to produce an output voltage rising in the sense or polarity representing lag of the mid-point of the range sweep voltage excursion 182 behind the pulse 187, but such a resulting voltage, amplified in stage 123, decreases the rectangular wave duration d (Fig. 7B) of the output of multivibrator 125, thus causing pulse 149 to be advanced in time and causing the range sweep excursion 182 to be correspondingly advanced. The extent of the advancement in time-phase of the mid-point of range sweep excursion 182 is very nearly as great as the extent of advancement of pulse 187, so that substantial coincidence is maintained between the mid-point of excursion 182 and pulse 187.

Through the action of potentiometer 146, meanwhile, the effective resistance of tube 135 is progressively decreased, so that the voltage excursions such as illustrated at 182' (Fig. 7E) for shorter target ranges such as that represented at 187' in Fig. 7G, are made appreciably steeper than those for the greater ranges.

Since many changes could be made in the above construction and many apparently widely different embodiments of this invention could be made without departing from the scope thereof, it is intended that all matter contained in the above description or shown in the accompanying drawings shall be interpreted as illustrated and not in a limiting sense.

What is claimed is:

1. A bombing indicator for use in an aircraft radar bombing system including radar pulse timing, transmitting, receiving and directive scanning apparatus and a computer providing continuously computed data on relative position of the target, the bombing indicator comprising: a cathode ray oscilloscope including electron beam generating and intensity control means and beam deflection means, means coupled to said radar apparatus and to said computer for supplying to said oscilloscope intensity control means range marker pulses timed after the transmitted radar pulses by a time delay interval decreasing as the target is approached according to the computed variation of target range, means including a timing multivibrator for producing a relatively short-duration range sweep voltage excursion following each transmitted radar pulse by an interval dependent upon the operating voltage of said multivibrator, means coupled to said computer and to said sweep voltage excursion producing means for varying the sweep voltage excursion duration according to computed variations of target range, means including a phase comparator means coupled to said range marker pulse supplying means for producing an output voltage varying in magnitude and sense with variations of relative phase of the range marker pulses and said range sweep voltage excursions, and means supplying said output voltage to said multivibrator for controlling the length of the intervals between radar pulse transmissions and the range sweep voltage excursions.

2. A bombing indicator for an aircraft radar bombing system including radar sending, scanning, receiving and pulse timing apparatus and a computer for providing continuously computed data of relative position of a selected target, the bombing indicator comprising: a cathode ray oscilloscope including electron beam generating and intensity control means and beam deflection means, means coupled to said radar apparatus and to said computer for supplying to the intensity control means of said oscilloscope range marker pulses delayed after the transmitted radar pulses by a time delay interval decreasing according to the computed decrease of target range as the target is approached, means for supplying to said cathode ray oscilloscope beam deflection means a relatively short duration range sweep voltage excursion following each transmitted radar pulse, said last-named means including voltage responsive means for timing said sweep voltage excursions by time intervals following the transmitted radar pulses which are dependent upon the voltage thereof, means coupled to said computer and to said short duration range sweep voltage excursion producing means for varying the steepness of slope of said excursions substantially inversely according to variations of computed range, means including a phase comparator coupled to said range marker pulse supply means for producing an output voltage varying in magnitude and sense with variations of relative phase of the range marker pulses and said range sweep voltage excursions and applying said output voltage to said voltage responsive means included in said range sweep voltage excursion producing means for controlling the timing of said range sweep voltage excursions according to said range marker pulses.

3. In an aircraft radar bombing system including radar pulse timing, transmitting, receiving, and directive scanning apparatus, and a computer for providing continuously computed data on relative position of the target, a bombing indicator comprising: a cathode ray oscilloscope including electron beam generating and intensity control means and beam deflection means, means coupled to said radar apparatus and to said computer for supplying to the intensity control means of said oscilloscope radar video signals and range marker pulses delayed after the transmitted radar pulses by a time delay interval decreasing as the target is approached according to the computer variation of target range, means including a timing multivibrator for producing a relatively short-duration range sweep voltage excursion following each transmitted radar pulse by an interval dependent upon the operating voltage of said multivibrator, means including a phase comparator means coupled to said range marker pulse supplying means for producing an output voltage varying with variations of relative phase of the range marker pulses and said range sweep voltage excursions, and means supplying said output voltage to said multivibrator for controlling the length of the intervals between radar pulse transmissions and the range sweep excursions.

4. A bombing indicator for use in an aircraft radar bombing system including a radar pulse timing, transmitting, receiving and directive scanning apparatus and a computer providing continuously computed data on relative position of the target, the bombing indicator comprising: a cathode ray oscilloscope including electron beam generating and intensity control means and vertical and horizontal beam deflection means, means coupled to said radar apparatus and to said computer for supplying to said oscilloscope intensity control means range marker pulses timed after the transmitted radar pulses by a time delay interval decreasing as the target is approached according to the computed variation of target range, means coupling said oscilloscope intensity control means to the radar receiving apparatus for varying the beam intensity according to variations of the video output voltage of the radar receiver, means coupled to said horizontal beam deflection means for deflecting said beam horizontally in synchronism with the operation of said scanning apparatus, means including voltage responsive timing means for producing a relatively short-duration range sweep voltage excursion delayed after each transmitted radar pulse by an interval dependent upon the operating voltage of said timing means, means including a phase comparator means coupled to said range marker pulse supplying means for producing an output voltage varying according to relative phase of the range marker pulses and said range sweep voltage excursions, and means for supplying said output voltage to said voltage responsive timing means for controlling the length of the delay intervals between radar pulse transmissions and the range sweep voltage excursions.

5. In a radar system of the type indicating the relative positions of an aircraft and an objective and including radar pulse transmitting and receiving apparatus, a timing control device for timing the transmitted pulses at predetermined recurrence intervals and means including a computer providing range marker pulses at varying delay after the transmitted pulses representing the computed variation of range to the objective, vernier comparison indicating apparatus comprising: a cathode ray oscilloscope including a fluorescent screen and means for generating an electron beam and directing it toward said screen and means for modulating its intensity and for deflecting it in at least one direction, means for supplying to said beam deflecting means recurrent range sweep waves having relatively short duration substantially linear voltage excursions variably delayed after the transmitted pulses, means for varying the slope of said excursions according to computed range variations, and means responsive to said computer for varying the time delay of commencement of said excursions after the transmitted pulses by a time margin equal to the difference between the time delay of the computed range pulses and one-half the time duration of said excursions.

6. Vernier bombing indicator apparatus for use in a radar system of the type indicating the relative positions of an aircraft and a bombardment objective and including radar pulse transmitting and receiving apparatus, a timing control device for timing the transmitted pulses at predetermined recurrence intervals, and means including a computer for providing range marker pulses at varying delay after the transmitted pulses representing the computed variation of range to the objective, said vernier bombing indicator apparatus comprising: a cathode ray oscilloscope including a fluorescent screen and means for generating an electron beam and directing it toward said screen and means for modulating its intensity and for deflecting it, means coupled thereto for varying the intensity of said beam according to the radar receiver output and according to said range marker pulses, means for producing recurrent range sweep voltage excursions of relatively short duration and variably delayed after the transmitted pulses, means for applying said sweep waves to the vertical deflection means of said oscilloscope, and means for controlling the delay of said range sweep excursions according to the delay of said marker pulses to retain said marker pulses substantially concurrent with the passages of said sweep voltage waves through their mid-points, said last-named means comprising means having a first input circuit receiving said range sweep excursions and a second input circuit receiving said marker pulses for producing an output voltage varying in a first sense with lag of said marker pulses after the mid-points of said range sweep excursions and in the opposite sense with advancement of said marker pulses ahead of the mid-points of said range sweep voltage excursions, and means coupled to said last means and to said range sweep excursion producing means for increasing the delay of said excursions in response to rising voltage in said first sense and reducing the delay of said voltage rise portions in response to rising voltage in said second sense.

7. In combination, a first source of recurrent pulses of a predetermined recurrence frequency, a second source of recurrent pulses of said predetermined recurrence frequency but of variable phase delay with respect to the pulses from said first source, means for producing recurrent substantially linear voltage excursions of said predetermined reference frequency and of short duration relative to the recurrence period, means for producing auxiliary signals having voltage steps which occur substantially coincident with the instants when the respective voltage excursions attain maximum amplitude, means for combining said auxiliary signals and said voltage excursions to produce a composite signal having different voltage levels joined by each of said voltage excursions, means comparing the phase of said composite signal with the recurrent pulses from said second source for producing a signal varying according to the phase comparison therebetween, and means responsive thereto for varying the phase of said linear voltage excursions relative to the recurrent pulses from said first source.

8. The combination defined in claim 7, wherein said phase comparing means comprises means for producing zero output when the pulses from said second source coincide with the midpoints of said voltage excursions and producing proportionate voltage of a first polarity when said pulses lead the mid-points of said excursions and for producing proportionate voltage of the opposite polarity when said pulses lag the mid-points of said excursions.

9. Synchronized sweep voltage apparatus comprising means for producing recurrent substantially linear sweep voltage excursions spaced apart by appreciable intervals compared to the durations of said excursions, a generator for producing auxiliary signals having voltage steps which occur substantially coincident with the instants when the respective voltage excursions attain maximum amplitude, a mixer for combining said auxiliary signals and said voltage excursions to produce a composite signal having two different levels joined by said voltage excursions, means for producing recurrent pulses of very short durations compared to the durations of said sweep voltage excursions and of substantially equal recurrence frequency, means responsive to said composite signal and to said recurrent pulses for producing an output voltage varying in polarity and magnitude according to the sense and extent of divergence from synchronization of said recurrent pulses and the mid-points of said sweep voltage excursions, and means responsive to the output voltage of said phase comparator means for advancing the relative phase of said sweep voltage excursions when the output voltage of said phase comparator means increases in the polarity corresponding to phase lag of said excursions and for retarding said excursions when the output voltage of said phase comparator means increases in the opposite polarity.

10. Apparatus for producing substantially constant-amplitude recurrent voltage waves including an extensive level or constant-voltage portion and an inclined portion of controllable duration in each cycle, comprising: a saw-tooth wave generator including a capacitor and an electronic control device coupled thereto, a trigger circuit coupled to said electronic control device of said generator, said trigger circuit having a first stable condition for holding constant the voltage across said capacitor and having a second stable condition for initiation of a voltage rise thereacross, means responsive to said saw-tooth wave generator for triggering said trigger circuit from said second stable condition to said first stable condition upon attainment of a predetermined voltage in the output wave of said generator, a source of recurrent reference pulses, means including a multivibrator coupled to said source and a pulse forming circuit coupling the multivibrator to said trigger circuit for regularly triggering said trigger circuit from said first stable condition to said second stable condition, said multivibrator providing an output wave delaying the pulses supplied to said trigger circuit through said pulse forming circuit after the respective pulses supplied by said source, and variable voltage means coupled to said multivibrator for variably delaying the pulses supplied to the trigger circuit after the reference pulses according to variations of the phase relations between the inclined wave portions of the recurrent voltage waves and said reference pulses.

11. Apparatus for producing substantially constant-amplitude recurrent voltage excursions of variable slope and synchronizing them with a series of recurrent pulses, comprising: a wave generator including a capacitor and an electronic control device coupled thereto, a trigger circuit coupled to said electronic control device of said wave generator, said trigger circuit having a first stable condition for causing said electronic control device to hold the voltage across said capacitor constant and having a second stable condition for initiating unidirectional current flow in the circuit of said capacitor for producing a voltage excursion therein, means responsive to the output of said wave generator for triggering said trigger circuit to said first stable condition upon attainment of a predetermined instantaneous voltage in the output wave of said generator, means including a multivibrator and pulse forming circuit coupled to said trigger circuit for regularly triggering said trigger circuit from said first stable condition to said second stable condition, means operatively coupled to said multivibrator and jointly responsive to the output of said wave generator and to said recurrent pulses for controlling the timing of the pulses supplied through said pulse forming circuit to said trigger circuit, said last named means including voltage varying means for advancing the pulses supplied to said trigger circuit when said recurrent pulses occur within the first halves of the voltage excursions of the output waves from the wave generator and for retarding said pulses supplied to said trigger circuit when said recurrent pulses occur in the latter halves of the excursions.

12. Apparatus for producing substantially constant-amplitude recurrent voltage waves including repetitive excursions of controllable duration separated by extensive level or constant-voltage portions, and for holding said excursions substantially symmetrical about a series of recurrent pulses, comprising a wave generator including a capacitor circuit and an electronic control device coupled thereto, a trigger circuit coupled to said electronic control device of said generator, said trigger circuit having a first stable condition for holding the voltage across said capacitor constant and having a second stable condition for initiating a voltage excursion therein, means responsive to said wave generator for triggering said trigger circuit from said second stable condition to said first stable condition upon attainment of a predetermined instantaneous voltage in the output wave of said generator, a source of recurrent timing reference pulses, a source of recurrent pulses of variable phase delay relative to said timing reference pulses, means including a multivibrator coupled to said source of reference pulses for triggering said trigger circuit from said first stable condition to said second stable condition at the end of a delay period after each of said reference pulses, phase comparator means jointly responsive to the output of said wave generator and said source of variable phase recurrent pulses for producing an output voltage varying according to variations of relative phase therebetween, and means coupling said phase comparator means to said multivibrator for increasing the time delay of triggering said trigger circuit when said variable phase pulses occur in the latter halves of said excursions and for decreasing the time delay of triggering said trigger circuit when said variable phase pulses occur in the earlier halves of said excursions.

13. Apparatus for producing recurrent sweep voltage excursions having their mid-points delayed after a series of recurrent reference pulses by time delay equal to that of a series of variably phased recurrent pulses, comprising: means including a voltage-responsive variable delay circuit for producing a sweep voltage excursion initiated an appreciable time after said reference pulses, and means including a phase comparator jointly responsive to the output of said preceding means and said variably phased recurrent pulses for supplying to said voltage responsive variable delay circuit a voltage varying according to the time average of departure of said mid-points of said excursions from time-coincidence with said variably phased pulses.

14. Apparatus as defined in claim 13, further including means coupled to said jointly responsive means for supplementing the output of said sweep voltage excursion producing means with rectangular voltage waves extending from the ends of said excursions to the following reference pulses.

15. Apparatus for providing a scan raster having a distinctive mid-line, comprising a cathode ray oscilloscope including electron beam generating and intensity control means and beam deflection means, means for supplying recurrent pulses of a first recurrence frequency to said intensity control means, sweep generator means for recurrently sweeping said beam in a first direction at the frequency of said recurrence frequency, means for supplementing the output of said sweep generator means with rectangular voltage waves substantially coincident with the instants when the beam attains substantially maximum displacement to produce a composite signal, means including a phase comparator responsive to said composite signal and to said recurrent pulses for holding a predetermined phase relation between said recurrent pulses and the recurrent sweeps of the electron beam, and means for sweeping said beam transversely of said first direction at a frequency different from said first recurrence frequency.

16. Apparatus for producing recurrent voltage excursions timed for symmetry with a train of recurrent pulses, comprising means for generating recurrent voltage excursions, means for producing auxiliary signals having voltage steps which occur substantially coincident with the instants when the respective voltage excursions attain maximum amplitude, means for combining said auxiliary signals and said voltage excursions to produce a composite signal having two different levels joined by said voltage excursions, means receiving said composite signal and responsive to said recurrent pulses for producing an output voltage of polarity and magnitude varying according to the sense and extent of departure from coincidence of said pulses with the midpoints of said excursions, and means responsive to said last named means for varying the relative timing of said pulses and said excursions.

17. In combination, a first source of recurrent pulses of a predetermined recurrence frequency, a second source of recurrent pulses of said predetermined recurrence frequency but of variable phase delay with respect to the pulses from said first source, means for producing recurrent substantially linear voltage excursions of said predetermined reference frequency and of short duration relative to the recurrence period, means for varying the slope of said voltage excursions in accordance with the time difference between the recurrent pulses from said first and second sources, means for limiting the extent of the voltage change in the respective excursions to a predetermined value, means comparing the phase of said voltage excursions with the recurrent pulses from said second source for producing a signal varying according to the phase comparison therebetween, and means responsive thereto for varying the phase of said linear voltage excursions relative to the recurrent pulses from said first source.

18. In combination, a first source of recurrent pulses of a predetermined recurrence frequency, a second source of recurrent pulses of said predetermined recurrence frequency but of variable phase delay with respect to the pulses from said first source, means for producing recurrent substantially linear voltage excursions of short duration relative to the recurrence period, a multivibrator responsive to the pulses produced by said first source for spacing the initial points of the voltage excursions from the pulses produced by said first source, means comparing the phase of said linear voltage excursions with the recurrent pulses from said second source for producing a signal varying according to the phase comparison therebetween, and means responsive to said signal for changing the operating potential of said multivibrator and thereby changing the delay between the pulses from said first source and the initial points of the voltage excursions.

References Cited in the file of this patent
UNITED STATES PATENTS

| | | |
|---|---|---|
| 2,414,486 | Rieke | Jan. 21, 1947 |
| 2,421,747 | Englehardt | June 10, 1947 |
| 2,422,697 | Meacham | June 24, 1947 |
| 2,459,699 | Hallmark | Jan. 18, 1949 |
| 2,463,685 | Fredendall et al. | Mar. 8, 1949 |